(12) United States Patent
Matsumoto et al.

(10) Patent No.: US 9,487,118 B2
(45) Date of Patent: Nov. 8, 2016

(54) FRAME STRUCTURE FOR BACKREST AND METHOD FOR MANUFACTURING THE SAME

(75) Inventors: Satoshi Matsumoto, Nagoya (JP); Koji Yamaguchi, Nagoya (JP); Yoshito Kuroda, Nagoya (JP)

(73) Assignee: Toray Industries, Inc. (JP)

( * ) Notice: Subject to any disclaimer, the term of this patent is extended or adjusted under 35 U.S.C. 154(b) by 83 days.

(21) Appl. No.: 14/232,402

(22) PCT Filed: Jul. 6, 2012

(86) PCT No.: PCT/JP2012/067343
§ 371 (c)(1),
(2), (4) Date: Jan. 13, 2014

(87) PCT Pub. No.: WO2013/008752
PCT Pub. Date: Jan. 17, 2013

(65) Prior Publication Data
US 2014/0139004 A1 May 22, 2014

(30) Foreign Application Priority Data
Jul. 13, 2011 (JP) ................................. 2011-154963

(51) Int. Cl.
*B60N 2/68* (2006.01)
*B29C 45/14* (2006.01)

(52) U.S. Cl.
CPC ........... *B60N 2/68* (2013.01); *B29C 45/14786* (2013.01)

(58) Field of Classification Search
CPC ......................................................... B60N 2/68
USPC ........................................ 297/452.18, 452.14
See application file for complete search history.

(56) References Cited

U.S. PATENT DOCUMENTS

| | | | | |
|---|---|---|---|---|
| 4,350,390 A * | 9/1982 | Ogawa | ..................... | A47C 5/00 297/452.18 |
| 5,026,121 A * | 6/1991 | Ratalahti | .................. | A47C 4/02 297/440.1 |
| 5,108,151 A * | 4/1992 | Peters | .................... | B60N 2/686 297/452.18 |
| 5,251,963 A * | 10/1993 | Inayoshi | ................ | B60N 2/686 297/452.12 |
| 6,490,834 B1 * | 12/2002 | Dagher | ..................... | E04H 9/04 52/309.1 |
| 6,607,247 B2 * | 8/2003 | Becker | ................. | B60N 2/4228 297/216.13 |

(Continued)

FOREIGN PATENT DOCUMENTS

| JP | 59-35126 | 3/1984 |
|---|---|---|
| JP | 3-31339 | 3/1991 |
| JP | 2001-269996 | 10/2001 |

(Continued)

*Primary Examiner* — Timothy J Brindley
(74) *Attorney, Agent, or Firm* — DLA Piper LLP (US)

(57) ABSTRACT

A backrest frame structure made of a resin and having a gate-shaped profile includes side frames extending in parallel to each other on both sides thereof and a transverse frame extending between top portion of the side frames integrally connected to the transverse frame, wherein a belt-shaped FRP sheet in which reinforcing fibers are unidirectionally-oriented is set as extending continuously or intermittently at least on the transverse frame between the side frames, and a matrix resin of the set FRP sheet and a resin constituting the transverse frame are integrally joined.

20 Claims, 4 Drawing Sheets

(56) References Cited

U.S. PATENT DOCUMENTS

| | | | | |
|---|---|---|---|---|
| 8,511,748 B2 * | 8/2013 | McLeod | B60N 2/686 | |
| | | | 297/216.1 | |
| 2008/0038569 A1 * | 2/2008 | Evans | B60N 2/68 | |
| | | | 428/474.9 | |
| 2013/0069415 A1 * | 3/2013 | Yasuda | B60N 2/682 | |
| | | | 297/452.18 | |
| 2013/0134756 A1 * | 5/2013 | Hisamoto | B60N 2/1615 | |
| | | | 297/313 | |
| 2014/0159462 A1 * | 6/2014 | Matsumoto | B60N 2/68 | |
| | | | 297/452.18 | |
| 2014/0284987 A1 * | 9/2014 | Yasuda | B60N 2/686 | |
| | | | 297/452.18 | |
| 2015/0210194 A1 * | 7/2015 | Furuta | B60N 2/48 | |
| | | | 297/391 | |

FOREIGN PATENT DOCUMENTS

| | | |
|---|---|---|
| JP | 2004-16709 | 1/2004 |
| JP | 2005-194 | 1/2005 |
| JP | 2005-334364 | 12/2005 |
| JP | 2007-290585 | 11/2007 |
| JP | 2010-500198 | 1/2010 |
| JP | 2010-94436 | 4/2010 |
| JP | 2010-220748 | 10/2010 |

* cited by examiner (a)

(b)

FRAME STRUCTURE FOR BACKREST AND METHOD FOR MANUFACTURING THE SAME

TECHNICAL FIELD

This disclosure relates to a frame structure for a backrest and its manufacturing method, and specifically relates to a frame structure suitable for a backrest of a car seat and its manufacturing method with a high stiffness while it is made of light resin.

BACKGROUND

A frame structure for a backrest, particularly a backrest of a vehicle seat, is expected to be lightweight to make the whole vehicle reduced in weight. Also, it is expected to have a high enough stiffness to properly protect passengers by enduring the moment generated by a great load of passengers or the like in the case of lateral or rear-end vehicle collision.

If such a frame structure is chiefly made of metal, the frame structure would have a comparatively complicated shape as disclosed in JP 2010-94436-A and, therefore, members of the frame would need to be bonded with many processes such as welding to meet the above-described demands. Besides, the structure chiefly made of metal cannot be reduced in weight so greatly.

On the other hand, FRP (Fiber-Reinforced Plastic) is a lightweight and high stiffness material known as an alternative to metal. Some prototypes of frame structure for a backrest have been made of FRPs as disclosed in JP 2005-194-A, JP 2010-500198-A and JP 2010-220748-A. However, it may be difficult that the structures disclosed in JP '194, JP '198 and JP '748 are formed with reinforcing fibers disposed at appropriate positions because the main structure parts of the frame structure are made of the FRP substantially as a whole or the reinforcing fibers exist inside the thickness of the main structure parts. Structures made of CFRP (Carbon Fiber-Reinforced Plastic) as disclosed in JP '194, JP '198 and JP '748 among FRPs would use many pieces of the expensive CFRP and, therefore, the production cost would increase. Further, it may be difficult for a whole of the frame structure disclosed in JP '194 to be formed as an integral structure because some portions of the frame structure have relatively complicated shape with unevenness and ribs to enhance the stiffness. As a result, there is a room for improvement in producing a lightweight and high stiffness frame structure at cheaper prices with ease.

Accordingly, it could be helpful to provide a frame structure and its manufacturing method at a cheaper price with ease, particularly by applying a new method to set a predetermined portion which should be reinforced with an FRP sheet.

SUMMARY

We provide a backrest frame structure made of a resin and having a gate-shaped profile including side frames extending in parallel to each other on both sides thereof and a transverse frame extending between top portion of the side frames integrally connected to the transverse frame, wherein a belt-shaped FRP sheet in which reinforcing fibers are unidirectionally-oriented is set as extending continuously or intermittently at least on the transverse frame between the side frames, and a matrix resin of the set FRP sheet and a resin constituting the transverse frame are integrally joined.

We also provide the frame structure, wherein the FRP sheet is continuously or intermittently set at least one a portion of the transverse frame such that the reinforcing fibers extend approximately in parallel in a width direction of the frame structure.

We further provide the frame structure, wherein the FRP sheet is continuously or intermittently set at least on a portion of the transverse frame such that the reinforcing fibers extend obliquely upward from sides of the side frames toward a center of the transverse frame.

We further provide the frame structure, wherein the FRP sheet is continuously or intermittently set at least on a portion of the transverse frame such that the reinforcing fibers extend in an oblique direction with respect to a width direction of the frame structure.

We further provide the frame structure, wherein the belt-shaped FRP sheet in which the reinforcing fibers are unidirectionally-oriented is continuously or intermittently set at least on a portion of both the side frames and the matrix resin of the set FRP sheet and the rein constituting the side frames are integrally joined.

We further provide the frame structure, wherein the belt-shaped FRP sheet in which the reinforcing fibers are unidirectionally-oriented is continuously or intermittently set at least on a portion of circumferences extending around from a backrest front side of both the side frames to a backrest back side along circumferences thereof while the matrix resin of the set FRP sheet and the resin constituting the side frames are integrally joined.

We further provide the frame structure, wherein the transverse frame is formed into a sheet-like shape of which width direction corresponds to an extending direction of the side frames.

We further provide the frame structure, wherein the transverse frame is formed into a sheet-like shape of which width direction corresponds to an extending direction of the side frames and wherein the transverse frame has greater widths at sides of the side frames and has a smaller width at a center between both side frames.

We further provide the frame structure, wherein the transverse frame is formed into a sheet-like shape of which width direction corresponds to an extending direction of the side frames, wherein the transverse frame has greater widths at sides of the side frames and has a smaller width at a center between both side frames and wherein a lower edge of the transverse frame is formed into an arch shape.

We further provide the frame structure, wherein the side frames have a U-shaped cross section opening laterally outward.

We further provide the frame structure, wherein the side frames are provided with connecting portions at lower ends to connect to a supporting portion to rotatably support the side frames.

We further provide the frame structure, wherein the transverse frame has a reinforcing portion to support the transverse frame from a back side.

We further provide the frame structure, wherein the transverse frame has a reinforcing portion to support the transverse frame from a back side and wherein the reinforcing portion is a rib extending between the side frames.

We further provide the frame structure, wherein the reinforcing fibers of the belt-shaped FRP sheet are continuous fibers.

We further provide the frame structure, wherein the set FRP sheet is a prepreg sheet made by impregnating a sheet of the unidirectionally-oriented reinforcing fibers with a thermoplastic resin in advance.

We further provide the frame structure, wherein the reinforcing fibers are carbon fibers.

We further provide the frame structure, wherein the frame structure for the backrest is made of a thermoplastic resin.

We further provide the frame structure, wherein the frame structure for the backrest is made of a thermoplastic resin and wherein an injection molding is applied with the thermoplastic resin.

We further provide the frame structure, wherein the frame structure for the backrest is made of a thermoplastic resin and wherein the thermoplastic resin contains discontinuous reinforcing fibers.

We further provide the frame structure, wherein the frame structure is applied to a vehicle seat.

We further provide a method of manufacturing the frame structure, including placing a belt-shaped FRP sheet in which reinforcing fibers are unidirectionally-oriented in a mold and injecting a resin to be formed integrally in the mold.

Figure 1:
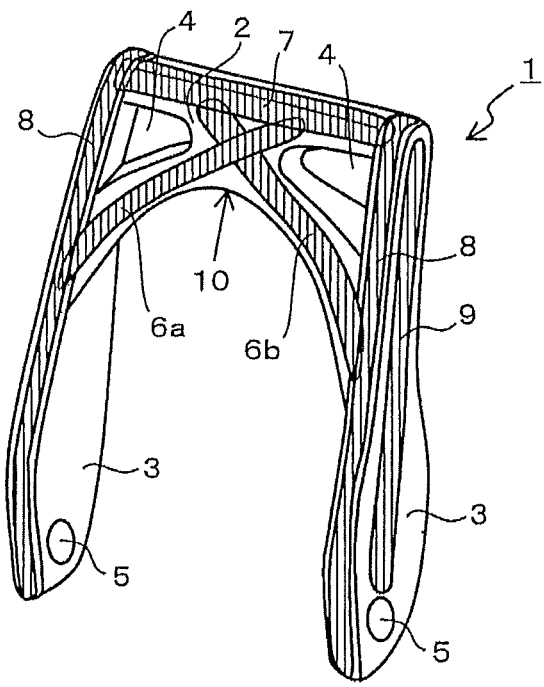
FIG. 1 is a schematic perspective view of a frame structure for a backrest according to an example.

EXPLANATION OF SYMBOLS 1, 11, 21, 31, 41, 51: frame structure for backrest
2, 32, 42, 52: transverse frame
3, 33, 43, 53: side frame
4: opening
5: connecting portion
6a, 6b, 7, 8, 9, 12a, 12b, 13, 22a, 22b, 34a, 34b, 35a, 35b, 36a, 36b, 37, 38: belt-shaped FRP sheet
10: arch shape
39: cross sectional structure
44, 54a, 54b: rib
45: reinforcing member

DETAILED DESCRIPTION

Our frame structure for a backrest is made of a resin and has a gate-shaped profile consisting of side frames extending in parallel to each other on both sides and a transverse frame extending between the tops of both the side frames integrally connected to the transverse frame, characterized in that a belt-shaped FRP sheet in which reinforcing fibers are unidirectionally-oriented is set as extending continuously or intermittently at least on the transverse frame between the side frames, and a matrix resin of the set FRP sheet and a resin constituting the transverse frame are integrally joined.

In such a frame structure for the backrest, the belt-shaped FRP sheet in which reinforcing fibers are unidirectionally-oriented is set at least on the surface of the transverse frame of the resinous gate-shaped frame structure provided with the transverse frame extending over the span between the tops of both the side frames, wherein the matrix resin of the FRP sheet and the resin constituting the transverse frame are integrally joined. The transverse frame receives a backrest load of passengers and transmits the load to both the side frames. The belt-shaped FRP sheet is set on the transverse frame as a main component of the frame structure for the backrest to be integrated so that the transverse frame is properly reinforced to be high-stiffness as using the lightweight characteristics of the transverse frame. Because the FRP sheet is only set on the surface of the resinous frame, it is very easily positioned at a predetermined portion in producing frame structure with ease. Also, it can be produced at a low cost because the usage of the FRP sheets can be reduced from a structure of which frame sections are all made of FRP. As to the reinforcement by setting the FRP sheet, because a thin FRP sheet is only pasted along the surface shape of the transverse frame, any unevenness structure, special rib structure or the like is not required on the portion which should be reinforced. Even from this aspect, the easier production can be achieved at a lower cost. Therefore, a lightweight frame structure for a backrest of which predetermined portion has a high stiffness can be produced easily at a low cost.

Further, it is preferable that the FRP sheet is continuously or intermittently set at least on a portion of the transverse frame to make the reinforcing fibers extend approximately in parallel in a width direction of the frame structure. If the reinforcing fibers are positioned to extend approximately in parallel in the width direction of the frame structure, the stiffness of the gate-shaped frame structure can be enhanced as a whole by an enhanced stiffness against the bending deformation with passengers' backrest load as well as an enhanced connection strength of the transverse frame between both the side frames.

Furthermore, if the FRP sheet is continuously or intermittently set at least on a portion of the transverse frame to make the reinforcing fibers extend obliquely upward from sides of the side frames toward a center of the transverse frame, a transmission pathway of the load between the transverse frame and the side frames can be formed efficiently, corresponding to the moment caused by the backrest load so that the high stiffness is achieved more efficiently.

In the frame structure for the backrest, it is preferable that the FRP sheet is continuously or intermittently set at least on a portion of the transverse frame to make the reinforcing fibers extend in an oblique direction with respect to a width direction of the frame structure. If the FRP sheet is set in such a way, the extending reinforcing fibers could efficiently form the transmission pathway of the load applied to the transverse frame to the side frame sides. Thus, the load can be transmitted efficiently from the transverse frame to the side frame sides by using a less amount of the FRP sheets or a less amount of the reinforcing fibers so that the weight saving and the high stiffness can be achieved more efficiently.

Also, it is preferable that the belt-shaped FRP sheet in which the reinforcing fibers are unidirectionally-oriented is continuously or intermittently set at least on a portion of both the side frames and the matrix resin of the set FRP sheet and the resin constituting the side frames are integrally joined. In such a configuration, the bending deformation caused by a lateral load applied in the width direction of the frame structure can be efficiently suppressed so that the stiffness of the frame structure as a whole is enhanced desirably.

Where to set the FRP sheet on both the side frames can be selected appropriately. Specifically, if the belt-shaped FRP sheet in which the reinforcing fibers are unidirectionally-oriented is continuously or intermittently set at least on a portion of circumferences extending around from a backrest front side of both the side frames to a backrest back side along the circumferences while the matrix resin of the set FRP sheet and the resin constituting the side frames are integrally joined, the bending stiffness of the side frames in the front-back direction can efficiently be enhanced enough to effectively support the load of passengers applied to the transverse frame.

Although the shape of the transverse frame is not limited, if the transverse frame is formed into a sheet-like shape of which width direction corresponds to an extending direction of the side frames, the load applied to the transverse frame can be received efficiently and a pathway to transmit the load to the sides of the side frames can be formed.

Particularly, if the transverse frame has greater widths at sides of the side frames and has a smaller width at a center between both side frames, the load applied to the transverse frame can be received efficiently and the load can be transmitted to the side frames. Also, the area of the transverse frame can be appropriately reduced to contribute the weight saving of the frame structure as a whole.

Above all, if a lower edge of the transverse frame is formed into an arch shape, the area of the transverse frame can be appropriately reduced and the stress concentration can be prevented to make the strength and stiffness of a whole the frame structure desirable.

Although the sectional structure of the side frames is not limited, it is possible that the side frames have a U-shaped cross section opening laterally outward so that the FRP sheet extending along the circumference of the side frames can easily be pasted to effectively enhance the stiffness of the side frames with a simple sectional structure to achieve the improvement of the stiffness as well as the simplification of the forming and the production.

It is preferable that the side frames are provided with connecting portions at lower ends to connect to a supporting portion for rotatably supporting the side frames to make the backrest function to adjust angles and the like. Because the frame structure for the backrest is basically a resinous frame structure which can be integrally formed, such a connecting portion can easily be formed at the time of forming process.

It is possible that the transverse frame has a reinforcing portion to support the transverse frame from a back side. Even such a reinforcing portion can easily be formed integrally when a whole frame structure is formed. The reinforcing portion appropriately enhances the strength and stiffness of the transverse frame and, even the strength and stiffness of a whole frame structure can be appropriately enhanced.

The shape of the reinforcing portion is not limited and may be formed into a rib extending between the side frames. Such a reinforcing portion may extend over a broad span of the transverse frame and, alternatively, may locally exist within a narrow span.

It is preferable that the reinforcing fibers of the belt-shaped FRP sheet are continuous fibers. Because the set FRP sheets would reinforce at least a predetermined portion of the transverse frame and form a desirable transmission pathway of a load from the transverse frame side to the side frames sides, it is preferable that the reinforcing fibers of the FRP sheet are made from continuous fibers so that the reinforcement is efficiently achieved and the load transmission pathway is efficiently formed. It is ideal that a comparatively long FRP sheet is pasted on the frame structure from a viewpoint of maintaining the continuity of the stress acting on the reinforcing fibers. However, in the case that it is difficult for a sheet to be pasted on a complicated curved surface or the like, it is possible that a plurality of short FRP sheets such as sheets of which ends are overlapped to each other, are intermittently pasted with small distances to make the fibers continuous. Alternatively, it is possible that the folded sheet of which a part is cut is pasted.

Although the above-described set FRP sheet is not limited, if the FRP sheet is a prepreg sheet made by impregnating a sheet of the unidirectionally-oriented reinforcing fibers with a thermoplastic resin in advance, the sheet can easily be set on a target place at the time of forming. More concretely, positioning in the mold to set at the time of integral molding can be performed more easily so that a desirable forming can be achieved more easily.

The reinforcing fibers may be carbon fibers, glass fibers, aramid fibers, mixture of such fibers or the like. Above all, it is preferable that the reinforcing fibers are carbon fibers so that the excellent strength and improved stiffness as well as excellent formability are achieved. The carbon fibers would make it easy to design a target structure.

It is preferable that the frame structure for the backrest is made of a thermoplastic resin. Although it is even possible that it is made of a thermosetting resin, the thermoplastic resin is better to perform good formability. Particularly, if an injection molding method is applied with the thermoplastic resin, desirable frame structure for the backrest can be mass-produced at a high productivity.

Basically, only the portion to be set with the FRP sheet contains the reinforcing fibers. However, it is possible that the thermoplastic resin contains discontinuous reinforcing fibers. Such a configuration makes the frame structure for the backrest to be produced with more strength and higher stiffness.

The frame structure for the backrest is applicable to every seat. It is suitable as a vehicle seat such as car seat, which is highly required to be lightweight with a high-stiffness and advanced productivity.

Our manufacturing method of a frame structure for a backrest is a method manufacturing the above-described frame structure for the backrest, characterized in that a belt-shaped FRP sheet in which reinforcing fibers are unidirectionally-oriented is placed in a mold and a resin is injected to be formed integrally in the mold. Although there is an alternative that the FRP sheet is set on a formed resin frame and then heated to be integrated, it is preferable that a prepared belt-shaped FRP sheet is placed at a predetermined position and is integrated with the injected resin so that a high-quality frame structure for the backrest is produced efficiently at a high productivity.

In the frame structure for the backrest and its manufacturing method, because the belt-shaped FRP sheet in which the reinforcing fibers are unidirectionally-oriented is set at least on the transverse frame of the resinous frame structure to integrally join the matrix resin of the FRP sheet and the resin constituting the transverse frame, the stiffness of the transverse frame which receives the load and forms the load transmission pathway to the sides of the side frames can easily be enhanced efficiently while the stiffness of a whole frame structure is enhanced desirably as keeping the lightweight and the frame structure can be produced efficiently at a high productivity.

Hereinafter, desirable examples will be explained with reference to the FIGS.

FIG. 1 shows frame structure 1 of an example of our backrest. Frame structure 1 for a backrest is configured to be a gate-shaped solid resinous frame structure for a backrest of vehicle seats in which side frames 3 that extend parallel to each other on both sides and transverse frame 2 that extends between the tops of both the side frames are integrally connected. In this example, transverse frame 2 is provided with openings 4 on the left and right sides for reducing the weight while both side frames 3 are provided with connecting portions 5 (holes) at the lower ends to connect to a supporting portion (provided on the vehicle seats, not shown) for rotatably supporting side frames 3. Transverse frame 2 is configured to have a greater width at the sides of side frames 3 and has smaller width at the center of both side frames 3, as shaping arch shape 10 with the lower edge.

In such gate-shaped resinous frame structure 1 for a backrest, belt-shaped FRP sheets in which reinforcing fibers such as carbon fibers, are unidirectionally-oriented are set at least on transverse frame 2 surface so that the reinforcing fibers extend continuously or intermittently between side frames 3, and then a matrix resin of the set FRP sheets and a resin constituting the transverse frame are joined integrally to achieve an integral structure as a whole. The belt-shaped FRP sheets may be set in various ways. In this example, FRP sheets 6a and 6b are continuously set at least on a portion of transverse frame 2 so that the reinforcing fibers extend obliquely upward from the side of side frame 3 toward the center of transverse frame 2. On another portion (upper portion) of transverse frame 2 as a portion on which the FRP sheet is set, FRP sheet 7 is set continuously so that the reinforcing fibers extend approximately parallel in the width direction (right and left direction in FIG. 1) of frame structure 1. Though the FRP sheets have been set on the front side of frame structure of transverse frame 2 in FIG. 1, alternatively they may be set on the back side as well.

In this example, belt-shaped FRP sheets in which reinforcing fibers are unidirectionally-oriented are set continuously or intermittently at least on a portion of both side frames 3 so that the matrix resin of the set FRP sheet and the resin constituting the side frame are joined integrally. Particularly in this example, the belt-shaped FRP sheets 8 in which reinforcing fibers are unidirectionally-oriented are continuously along the circumference at least on a portion of the circumferences extending around from the front side of the backrest of both side frames 3 to the back side so that the matrix resin of set FRP sheet 8 and the resin constituting side frame 3 are joined integrally. Furthermore, in this example, even belt-shaped FRP sheets 9 are set on a portion other than the circumference of the both side frames 3 such as outer lateral surface portions of side frames 3 facing to the side surface so that the matrix resin of set FRP sheet 9 and the resin constituting side frame 3 are joined integrally. Though the FRP sheet has not been pasted on the inner lateral surface portions of side frames 3 facing to the side surface in FIG. 1, the FRP sheet may be arbitrarily pasted on such portions to enhance the stiffness of the side surface frame.

In such configured frame structure 1 for a backrest, belt-shaped FRP sheets 6a, 6b and 7 are set integrally on transverse frame 2, so that resinous lightweight transverse frame 2 is appropriately reinforced to enhance the stiffness. Because comparatively thin FRP sheets 6a, 6b and 7 are only set before being integrated, they are very easily positioned at predetermined places in producing frame structure 1 at a low cost with ease. In this example, because FRP sheets 6a and 6b are set so that the reinforcing fibers continuously extend obliquely upward from the side of the side frames toward the center of both side frames, the transmission pathway of the weight load applied to transverse frame 2 to the side of side frames 3 is formed with less usage of FRP sheets efficiently. Further, because FRP sheet 7 is set so that the reinforcing fibers extend approximately in parallel along the width direction of frame structure 1, the strength and stiffness of transverse frame 2 are enhanced and the connection strength between both side frames 3 is enhanced with transverse frame 2. Thus, the stiffness of gate-shaped frame structure 1 is enhanced as a whole. Furthermore, belt-shaped FRP sheets 8 may be set along the circumference of both side frames 3 so that the stiffness of side frames 3 is efficiently enhanced while the desirable load transmission pathway would easily be formed from the side of transverse frame 2 to the side of side frames 3. Furthermore, FRP sheets 9 may be set on the outer lateral surface of side frames 3 so that the stiffness of side frames 3 would be enhanced further. In this example, because transverse frame 2 has a sheet-like shape with an arch-like lower edge, transverse frame 2 has a small surface area to reduce in weight and has a shape capable of preventing the stress from concentrating so that frame structure 1 has been reduced in weight as a whole while the stiffness at portions to be reinforced have been enhanced efficiently.

Figure 2:
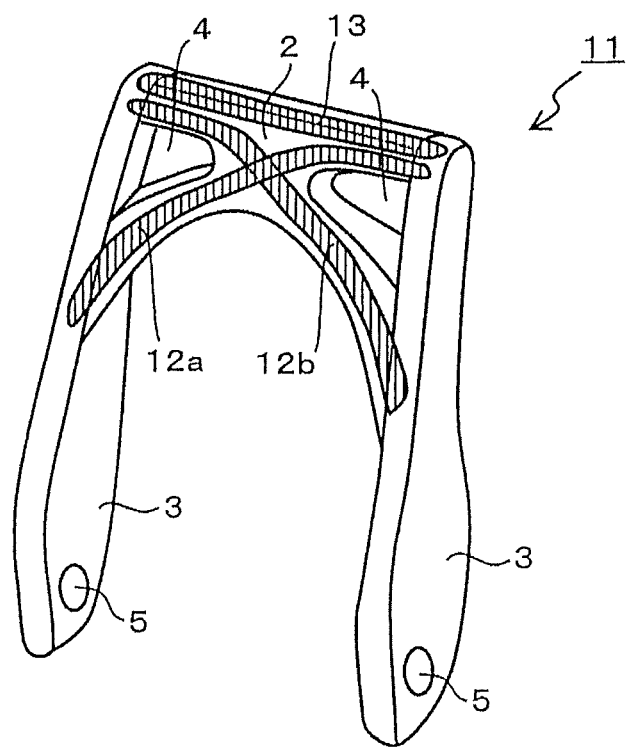
FIG. 2 is a schematic perspective view of a frame structure for a backrest according to another example.

Thus, at least the integral setting of FRP sheets can enhance the stiffness of transverse frame 2. Such a stiffness enhancement may be achieved in various ways. In frame structure 11 for backrest shown in FIG. 2, belt-shaped FRP sheets 12a and 12b extend obliquely upward from side frames 3 to the opposite sides of each side frame 3 via the center of transverse frame 2. Similarly to the above-described example shown in FIG. 1, even FRP sheet 13 extending over the span of both side frames 3 along the width direction of frame structure 11 is set in this example. FRP sheets 12a and 12b extend longer than the above-described example shown in FIG. 1 so that the stiffness of transverse frame 2 is enhanced further. Other aspects of configuration and mechanism are pursuant to the example shown in FIG. 1.

Figure 3:
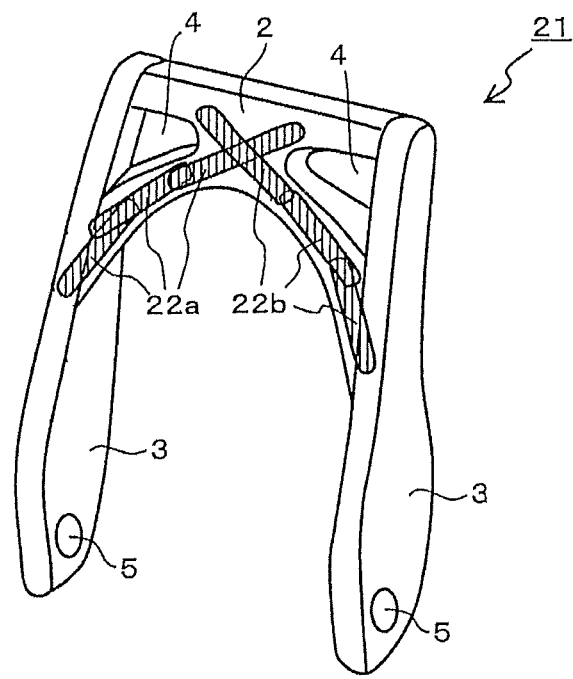
FIG. 3 is a schematic perspective view of a frame structure for a backrest according to yet another example.

In frame structure 21 for backrest shown in FIG. 3, a plurality of shorter FRP sheets 22a and 22b are set while the FRP sheets set on transverse frame 2 extend obliquely upward from the left and right side frames 3 like FRP sheets 6a and 6b shown in FIG. 1. The reinforcing fibers positioned by setting each FRP sheet 22a and 22b may extend in effect intermittently. Each FRP sheets 22a and 22b can be set close to each other to achieve a sufficiently great reinforcing effect. If FRP sheets 22a and 22b are formed into a short shape each, each FRP sheets 22a and 22b can easily be set on predetermined portions. Even if portions where the FRP sheets are to be set have curving or bending shapes, it will work with such shapes. Other aspects of configuration and mechanism are pursuant to the example shown in FIG. 1.

Figure 4:
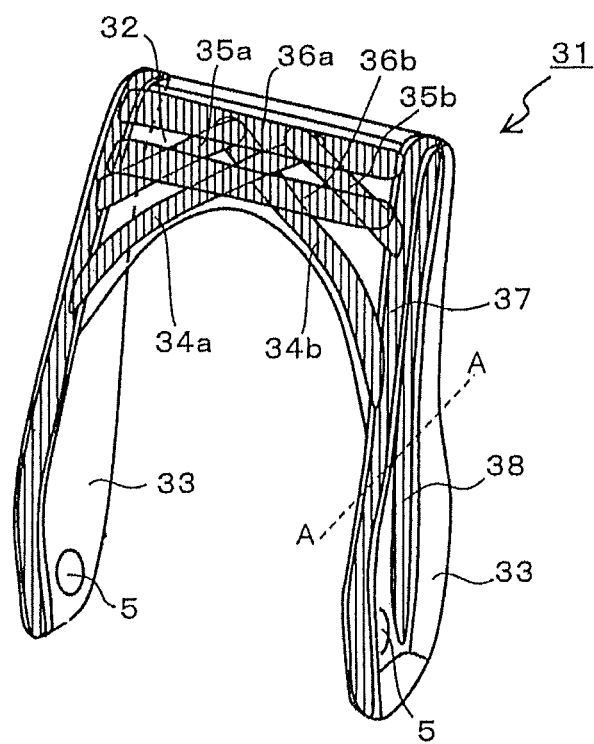
FIG. 4 is a schematic perspective view of a frame structure for a backrest according to yet another example.

Frame structure 31 for backrest shown in FIG. 4 is configured as gate-shaped frame structure 31 which comprises sheet-like shaped transverse frame 32 of which width direction corresponds to the extension direction of side frames 33 and two side frames 33 having a U-shaped cross section opening laterally outward. Such a cross section will be explained with reference to FIG. 5 later. In frame structure 31 for a backrest, while the FRP sheets are set as extending obliquely upward from the left and right side frames 33 as shown in FIG. 1, a plurality of FRP sheets 34a, 34b and 35b are set. In FIG. 4, FRP sheet 34a extends to the upper end of FRP sheet 35b after crossing FRP sheet 34b while FRP sheet 34b extends to the upper end of FRP sheet 35a after crossing FRP sheet 34a. As to the FRP sheet extending along the width direction of frame structure 31, a plurality of FRP sheets 36a and 36b are set. Such a plurality of extending FRP sheets would surely reinforce transverse frame 32 greatly. In this example, FRP sheets 37 are set along the circumference of side frames 33 having a U-shaped cross section and FRP sheets 38 are set on the outer lateral surface of side frames 33.

Figure 5:
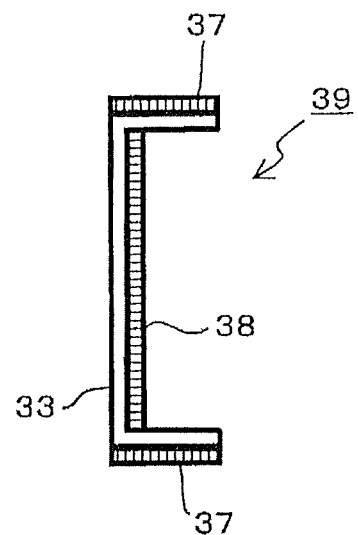
FIG. 5 is an enlarged cross sectional view of the frame structure in FIG. 4 along the A-A line.

FIG. 5 shows cross section structure 39 viewed along A-A line of side frame 33 of frame structure 31 for backrest in FIG. 4. FRP sheets 37 are set on the outer circumferential surfaces at both U-shaped arm parts of side frames 33 having the U-shaped cross section while FRP sheets 38 are set on the outer lateral surfaces at the bottom side of the U-shaped cross section. In such a structure, side frames 33 have been reinforced efficiently with set FRP sheets 37 and 38 without complicated unevenness on side frames 33 and ribs crossing to each other or the like. It has been made easy to be formed, too.

Figure 6:
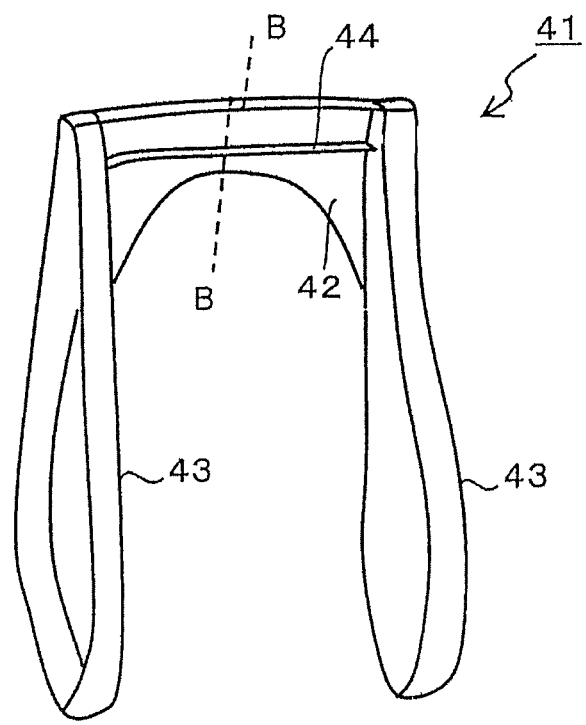
FIG. 6 is a schematic perspective view of a frame structure for a backrest viewed from a backside according to yet another example.
Figure 7:
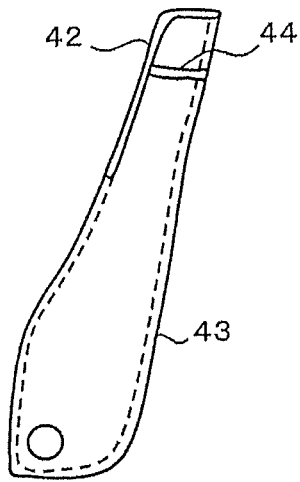
FIG. 7 is a sectional view of the frame structure in FIG. 6 along the B-B line, where (a) and (b) are each individual examples of configurations of reinforcing transverse frame.
Figure 7:
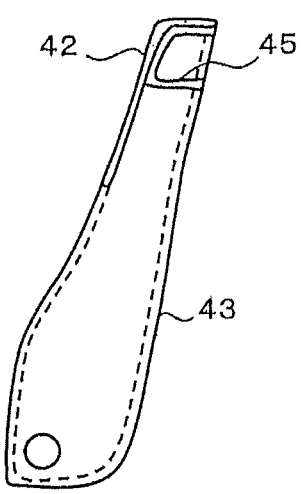

The transverse frame may be reinforced appropriately in terms of shape or structure other than the above-described FRP sheet setting. Specifically, the transverse frame can be reinforced appropriately by a reinforcing portion capable of supporting the transverse frame from the back side. FIG. 6 shows frame structure 41 for backrest viewed from the back side, in which frame structure 41 for backrest comprises transverse frame 42 and left and right side frames 43 while transverse frame 42 is provided with rib 44 as a reinforcing portion standing up from the back side. FRP sheets are not shown in FIG. 6. Rib 44 extends over the left and right side frames 43, and it is formed into a shape extending backward from the back side of transverse frame 42 as shown in FIG. 7 (a). Such a reinforcing structure may be made of an injected resin to make a frame structure by injection molding and, alternatively, may be preformed individually and then molded integrally in the mold. Such a structure of the reinforcing portion capable of supporting transverse frame 42 from the back side may be achieved in various ways. As shown in FIG. 7 (b), reinforcing member 45 having a cross section with a U-shaped opening toward the back side may be provided integrally on the back side of transverse frame 42.

Figure 8:
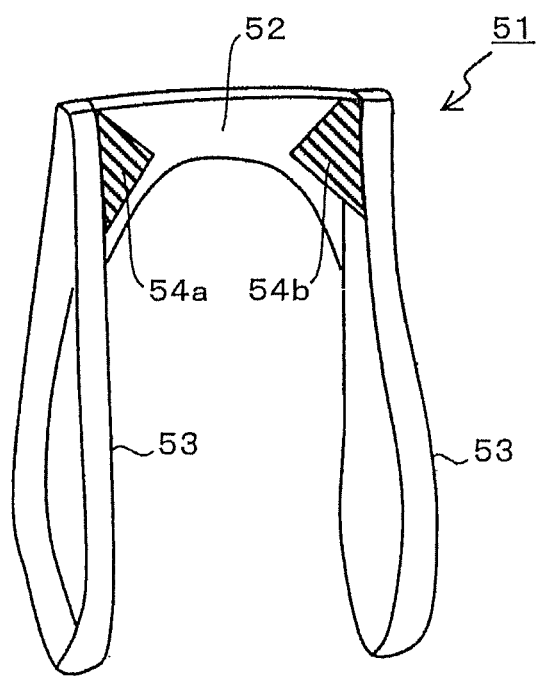
FIG. 8 is a schematic perspective view of a frame structure for a backrest viewed from a backside according to yet another configuration of a reinforcing transverse frame.

The reinforcing portion may be provided locally at appropriate positions, other than the above-described configuration extending over the span between the left and right side frames. FIG. 8 shows frame structure 51 for backrest viewed from the back side, where ribs as reinforcing portions extending obliquely toward the back side of each side frame 53 are provided only at both left and right sides of transverse frame 52 on the back side of transverse frame 52. Such ribs 54a and 54b like props can support transverse frames 52 from the back side against each back side of each side frame 53 so that the stiffness of transverse frame 52 is enhanced efficiently and the stiffness of the gate-shaped frame structure 51 for backrest is efficiently enhanced as a whole. Thus the transverse frame can be reinforced in various ways.

INDUSTRIAL APPLICATIONS

The frame structure for a backrest and a method of manufacturing the same is applicable to every seat expected to be lightweight specifically and is suitable as a vehicle seat.

The invention claimed is:

1. A backrest frame structure made of a resin and having a gate-shaped profile comprising side frames extending parallel to each other on both sides thereof and a transverse frame extending between top portion of the side frames integrally connected to the transverse frame, wherein
    a belt-shaped FRP sheet in which reinforcing fibers are unidirectionally-oriented is set as extending continuously or intermittently at least on the transverse frame between the side frames, a matrix resin of the set FRP sheet and a resin constituting the transverse frame are integrally joined, and a first portion of the FRP sheet is continuously or intermittently set on the transverse frame such that the reinforcing fibers extend approximately parallel to a width direction of the frame structure.

2. The frame structure according to claim 1, wherein a second portion of the FRP sheet is continuously or intermittently set on the transverse frame such that the reinforcing fibers extend obliquely upward from sides of the side frames toward a center of the transverse frame.

3. The frame structure according to claim 1, wherein a third portion of the FRP sheet is continuously or intermittently set on the transverse frame such that the reinforcing fibers extend in an oblique direction with respect to a width direction of the frame structure.

4. The frame structure according to claim 1, wherein the belt-shaped FRP sheet in which the reinforcing fibers are unidirectionally-oriented is continuously or intermittently set at least on a portion of both the side frames and the matrix resin of the set FRP sheet and the resin constituting the side frames are integrally joined.

5. The frame structure according to claim 1, wherein the belt-shaped FRP sheet in which the reinforcing fibers are unidirectionally-oriented is continuously or intermittently set at least on a portion of circumferences extending around from a backrest front side of both the side frames to a backrest back side along circumferences thereof while the matrix resin of the set FRP sheet and the resin constituting the side frames are integrally joined.

6. The frame structure according to claim 1, wherein the transverse frame is formed into a sheet-like shape of which width direction corresponds to a longitudinal direction of the side frames.

7. The frame structure according to claim 6, wherein the transverse frame has greater widths at sides of the side frames and has a smaller width at a center between both side frames.

8. The frame structure according to claim 7, wherein a lower edge of the transverse frame is formed into an arch shape.

9. The frame structure according to claim 1, wherein the side frames are provided with connecting portions at lower ends to connect to a supporting portion to rotatably support the side frames.

10. The frame structure according to claim 1, wherein the transverse frame has a reinforcing portion to support the transverse frame from a back side.

11. The frame structure according to claim 10, wherein the reinforcing portion is a rib extending between the side frames.

12. The frame structure according to claim 1, wherein the reinforcing fibers of the belt-shaped FRP sheet are continuous fibers.

13. The frame structure according to claim 1, wherein the set FRP sheet is a prepreg sheet made by impregnating a sheet of the unidirectionally-oriented reinforcing fibers with a thermoplastic resin in advance.

14. The frame structure according to claim 1, wherein the reinforcing fibers are carbon fibers.

15. The frame structure according to claim 1, wherein the frame structure for the backrest is made of a thermoplastic resin.

16. The frame structure according to claim 15, wherein an injection molding is applied with the thermoplastic resin.

17. The frame structure according to claim 15, wherein the thermoplastic resin contains discontinuous reinforcing fibers.

18. The frame structure according to claim 1, wherein the frame structure is applied to a vehicle seat.

19. A method of manufacturing a backrest frame structure comprising:
   providing a backrest frame structure made of a resin and having a gate-shaped profile comprising side frames extending parallel to each other on both sides thereof and a transverse frame extending between top portion of the side frames integrally connected to the transverse frame, wherein a belt-shaded FRP sheet in which reinforcing fibers are unidirectionally-oriented is set as extending continuously or intermittently at least on the transverse frame between the side frames, a matrix resin of the set FRP sheet and a resin constituting the transverse frame are integrally joined, and a first portion of the FRP sheet is continuously or intermittently set on the transverse frame such that the reinforcing fibers extend approximately parallel to a width direction of the frame structure,
   placing the belt-shaped FRP sheet in which reinforcing fibers are unidirectionally-oriented in a mold and injecting the resin to be formed integrally in the mold.

20. A backrest frame structure made of a resin and having a gate-shaped profile comprising side frames extending parallel to each other on both sides thereof and a transverse frame extending between top portion of the side frames integrally connected to the transverse frame, wherein
   a belt-shaped FRP sheet in which reinforcing fibers are unidirectionally-oriented is set as extending continuously or intermittently at least on the transverse frame between the side frames, and a matrix resin of the set FRP sheet and a resin constituting the transverse frame are integrally joined and the side frames have a U-shaped cross section opening laterally outward.

* * * * *